(12) United States Patent
Ely et al.

(10) Patent No.: US 11,538,135 B2
(45) Date of Patent: Dec. 27, 2022

(54) AUTOMATIC MULTI-IMAGE 3D GROUND CONTROL POINT EXTRACTION

(71) Applicant: Raytheon Company, Waltham, MA (US)

(72) Inventors: Richard W. Ely, Lewisville, TX (US); Jody D. Verret, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 140 days.

(21) Appl. No.: 16/800,846

(22) Filed: Feb. 25, 2020

(65) Prior Publication Data
US 2021/0264561 A1    Aug. 26, 2021

(51) Int. Cl.
*G01C 11/02*    (2006.01)
*G06T 3/00*    (2006.01)

(52) U.S. Cl.
CPC ............ *G06T 3/0068* (2013.01); *G01C 11/02* (2013.01)

(58) Field of Classification Search
CPC ......... G06T 3/0068; G06T 7/74; G06T 7/337; G06T 2207/10032; G06T 2207/30181; G01C 11/02
See application file for complete search history.

(56) References Cited

U.S. PATENT DOCUMENTS

| 9,275,267 | B2 | 3/2016 | Verret |
| 2014/0112579 | A1 | 4/2014 | Verret |
| 2015/0154747 | A1* | 6/2015 | Mareachen ........... G06T 7/0012 382/131 |
| 2015/0287215 | A1* | 10/2015 | Ohba ........................ G06T 7/50 382/103 |
| 2018/0107880 | A1* | 4/2018 | Danielsson .......... G08B 13/194 |
| 2018/0372493 | A1 | 12/2018 | Pilkington et al. |
| 2019/0251237 | A1* | 8/2019 | Park ....................... G06V 10/40 |

(Continued)

FOREIGN PATENT DOCUMENTS

CN            104574347 B    1/2019

OTHER PUBLICATIONS

"International Application Serial No. PCT/US2021/019401, International Search Report dated Jun. 14, 2021", 5 pgs.

(Continued)

*Primary Examiner* — Sam Bhattacharya
(74) *Attorney, Agent, or Firm* — Schwegman Lundberg & Woessner, P.A.

(57) ABSTRACT

Discussed herein are devices, systems, and methods for multi-image ground control point (GCP) determination. A method can include extracting, from a first image including image data of a first geographical region, a first image template, the first image template including a contiguous subset of pixels from the first image and a first pixel of the first image indicated by the GCP, predicting a first pixel location of the GCP in a second image, the second image including image data of a second geographical overlapping with the first geographical region, extracting, from the second image, a second image template, the second image template including a contiguous subset of pixels from the second image and a second pixel corresponding to the pixel location, identifying a second pixel of the second image corresponding to a highest correlation score, and adding a second pixel location of the identified pixel to the GCP.

14 Claims, 9 Drawing Sheets

(56) References Cited

U.S. PATENT DOCUMENTS

| | | |
|---|---|---|
| 2020/0020072 A1 | 1/2020 | Ely |
| 2020/0020116 A1 | 1/2020 | Ely |
| 2020/0193236 A1* | 6/2020 | Oosake .................... G06T 7/70 |

OTHER PUBLICATIONS

"International Application Serial No. PCT/US2021/019401, Written Opinion dated Jun. 14, 2021", 6 pgs.
"Taiwanese Application Serial No. 110105973, First Office Action dated Nov. 10, 2021", with machine translation, 13 pgs.

* cited by examiner

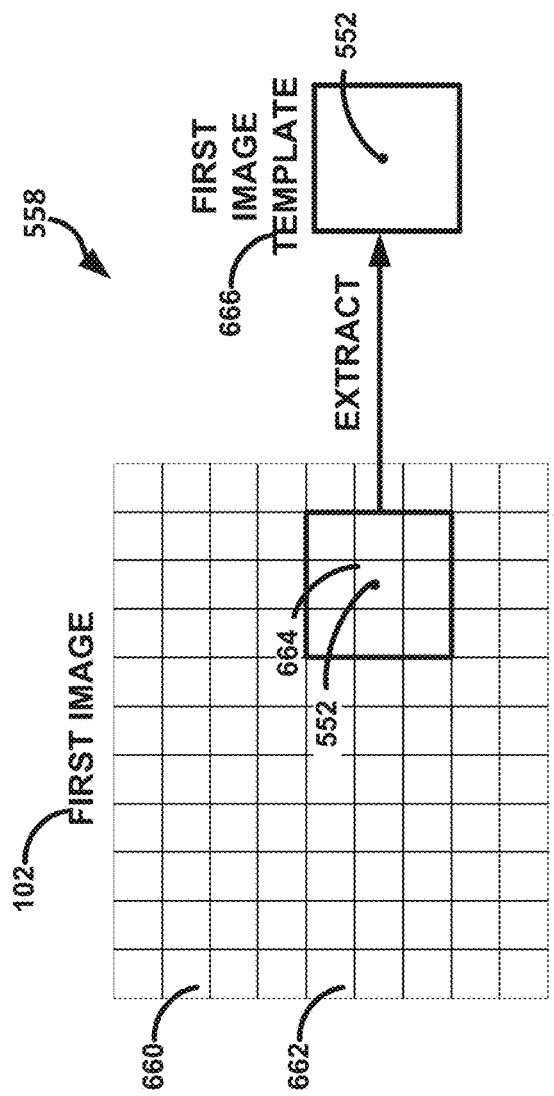
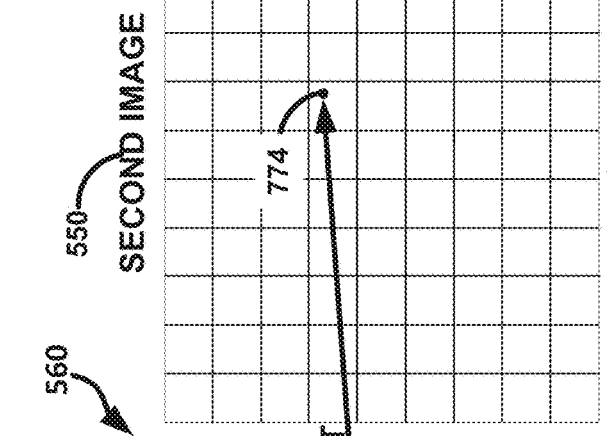
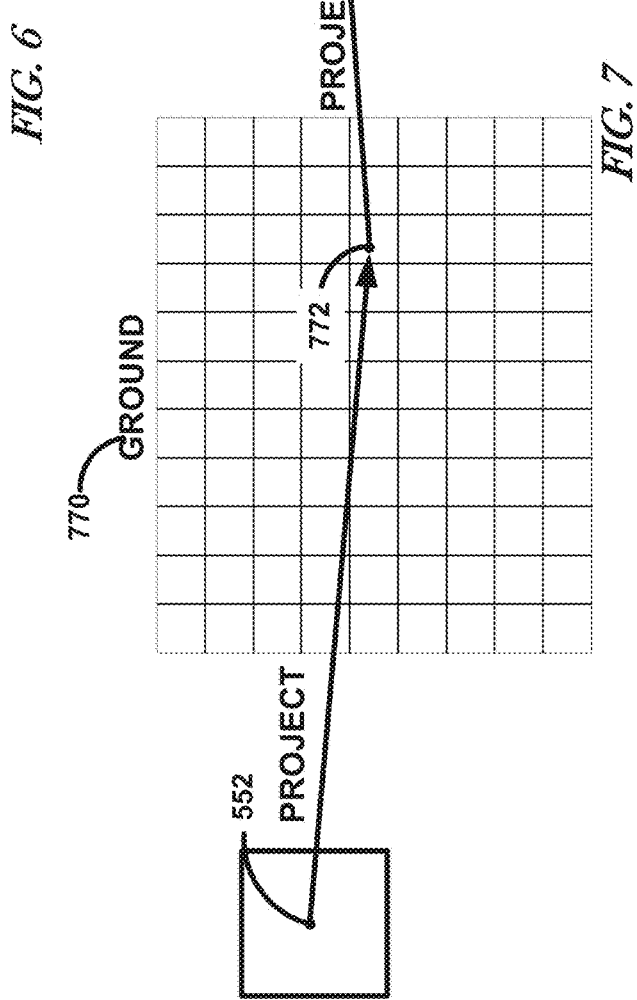
FIG. 6
FIG. 7

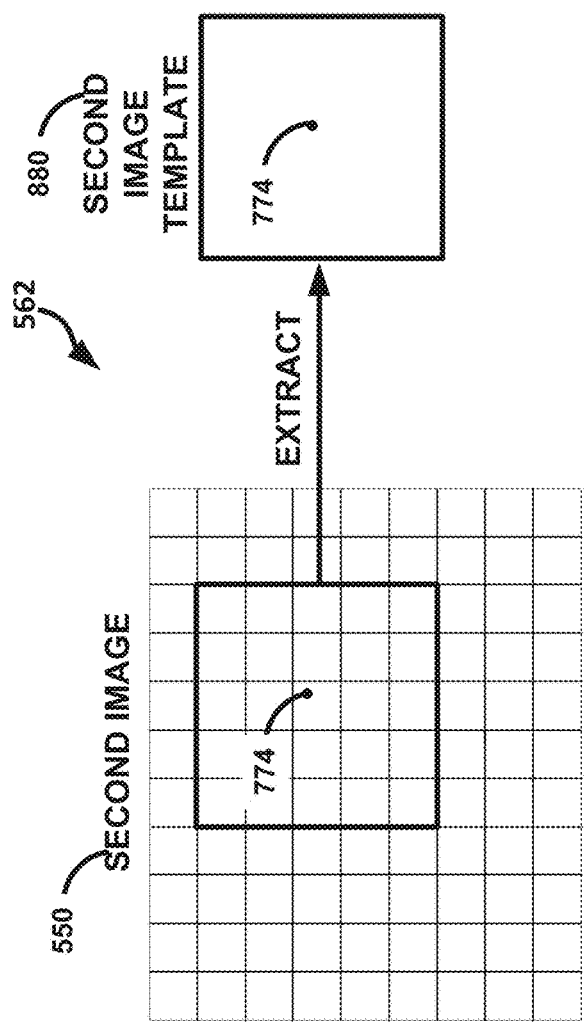
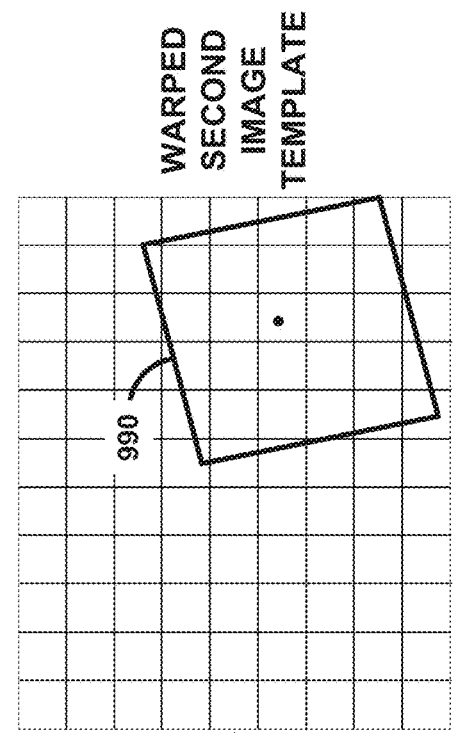
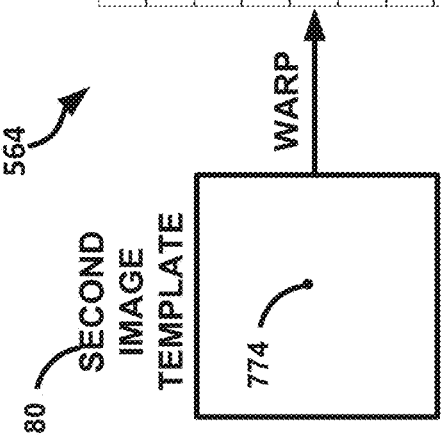
FIG. 8
FIG. 9

AUTOMATIC MULTI-IMAGE 3D GROUND CONTROL POINT EXTRACTION

TECHNICAL FIELD

Embodiments discussed herein regard devices, systems, and methods for automatic extraction of multi-image 3D ground control points (GCPs).

BRIEF DESCRIPTION OF THE DRAWINGS

FIG. 6 illustrates, by way of example, a diagram of an embodiment of extracting an image template from a first image.

FIG. 7 illustrates, by way of example, a diagram of an embodiment of projecting one or more points of the extracted image template to a second image.

FIG. 8 illustrates, by way of example, a diagram of an embodiment of extracting an image template from the second image.

FIG. 9 illustrates, by way of example, a diagram of an embodiment of warping the second image template to match geometry of the first image template.

DETAILED DESCRIPTION

Embodiments regard determining image coordinates (of two or more two-dimensional (2D) images) associated with a ground control point (GCP) from a three-dimensional (3D) point set. An advantage of embodiments can include providing a capability to accurately tie multiple 2D images together at a precise 3D location. The determined image coordinates can be used to assess geo-positional accuracy of the 3D point set if two or more of the 2D images (sometimes called stereo images) are from a highly accurate source, such as a Digital Point Positioning Database (DPPD). The determined image coordinates can be used to adjust the 3D point set to the highly accurate source, such as for targeting. The determined image coordinates can be used to register one or more other images to the 3D point set faster than prior techniques.

Embodiments described herein can register a 2D image to a 3D point set to obtain GCPs. Each GCP in the 2D image can be registered to one or more other images to form a "multi-chip GCP". The image-to-image registration can be centered at the projected GCP location. The 2D image to 2D image registration can include a cross correlation to find a conjugate in a second image. The 2D image to 2D image registration can be independent of the 3D point set. One or more quality metrics can be used to reduce or eliminate blunders.

The 2D image can be from an image sensor. The image sensor can include a synthetic aperture radar (SAR), electro-optical (EO), multi-spectral imagery (MSI), panchromatic, infrared (IR), nighttime EO, visible, nighttime visible, or another image sensor. Applications of accurate registration to a 3D source include cross-sensor fusion, change detection, 3D context generation, geo-positioning improvement, target locating, target identification, or the like. In an example, the registration includes forming a "synthetic image" by projecting the 3D point set to an image space of the image being registered and populating the pixel intensities with the image intensity attribute for each point contained in the point set. An edge-based, two-step registration technique, coarse registration followed by fine registration, may be used to extract a set of tie points (TPs) (that can be converted to control points (CPs)) for a set of image tiles. The CPs, which are derived from the 3D point set, in some embodiments, can be used in a geometric bundle adjustment to bring the 2D image into alignment with the 3D source.

The disclosure follows by first providing a description of example 2D image to 3D point cloud registration processes that provide GCPs. Then, the description proceeds by describing processes that extract multi-image GCPs.

FIGS. 1-4 illustrate an application of a multi-image GCP. FIGS. 5-10 illustrate techniques for determining the multi-image GCP.

Figure 1:
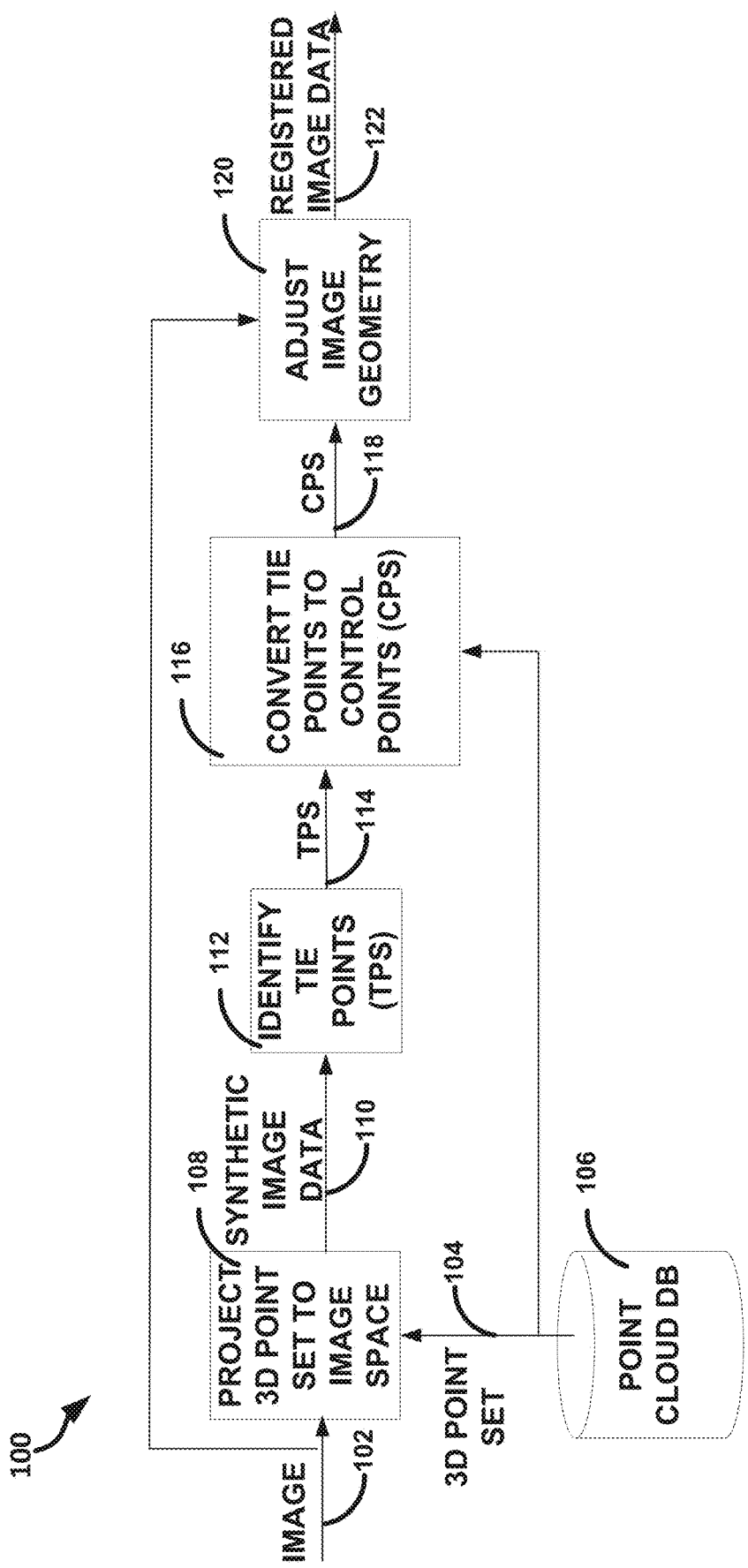
FIG. 1 illustrates, by way of example, a flow diagram of an embodiment of a method for 2D image registration to a 3D point set.

FIG. 1 illustrates, by way of example, a flow diagram of an embodiment of a method 100 for 2D image registration to a 3D point set. The method 100 includes receiving image 102 and a 3D point set 104. The image 102 can be from a SAR, EO, panchromatic, IR, MSI, nighttime EO, visible, nighttime visible, or another image sensor. The image sensor may be satellite based, located on a manned or unmanned aerial vehicle, mounted on a moveable or fixed platform, or otherwise positioned in a suitable manner to capture the image 102 of a region of interest. The 3D point set 104 can be from a point cloud database (DB) 106. The 3D point set 104 can be of a geographical region that overlaps with a geographical region depicted in the image 102. In some embodiments, the 3D point set 104 can be of a geographical region that includes the entire geographical region depicted in the image 102. In some embodiments, the 3D point set 104 can cover a larger geographical region than the geographical region depicted in the image 102.

The image registration can occur in an overlap between the 3D point set 104 and the image 102. The 3D point set data in the overlap (plus an uncertainty region) can be provided as input to operation 108. The overlap can be determined by identifying the minimum (min) and maximum (max) X and Y of the extent of the 3D point set intersected with the min and max X and Y of the image 102, where X and Y are the values on the axes of a geometric coordinate system of the image 102.

The operation 108 can include establishing a scale of the synthetic image data 110 and its geographical extent. The scale can be computed as a point spacing of the 3D point set 104 or as a poorer of the point spacing of the 3D point set 104 and the X and Y scale of the image 102. The geographical extent of the synthetic image data 110 can be determined by generating an X, Y convex hull of the 3D point set 104 and intersecting it with a polygon defined by X,Y coordinates of the extremes of the image 102. The minimum bounding rectangle of this overlap region can define an output space for the synthetic image data 110.

At operation 108, the 3D point set 104 can be projected to an image space of the image 102 to generate a synthetic image data 110. The image space of the image 102 can be specified in metadata associated with image data of the image 102. The image space can be the geometry of the image, such as a look angle, focal length, orientation, the parameters of a perspective transform, the parameters and coefficients of a rational polynomial projection (e.g., XYZ-to-image and/or image-to-XYZ), or the like. The operation 108 can include altering a geometry of synthetic image 110 derived from the 3D point set 104 to match the geometry of the image 102. As there is error in the geometry of the image 102 and in changing the geometry of the synthetic image 110 derived from the 3D point set 104, the synthetic image data 110 may not be sufficiently registered to the image 102 for some applications.

If more than one point from the 3D point set 104 projects to a same pixel of the synthetic image data 110, the point from the 3D point set that is closest to the sensor position can be used. This assures that only points visible in the collection geometry of the image 102 are used in the synthetic image data 110. Points that project outside the computed geographic overlap (plus some uncertainty region) can be discarded.

Each point in the 3D point set 104 can include an X, Y, Z coordinate, elevation, and color value (e.g., a grayscale intensity, red, green, blue intensity, or the like). In some embodiments a median of the intensities of the pixels that the point represents in all the images used to generate the 3D point set 104 can be used as the color value.

A geometry of an image can be determined based on a location, orientation, focal length of the camera, the parameters of a perspective transform, the parameters and coefficients of a rational polynomial projection (e.g., image-to-XYZ or XYZ-to-image projection or the like), and/or other metadata associated with the imaging operation in the image 102.

The initial synthetic image data 110 may have many pixels that were not filled (called void pixels). Void pixels are created when no point in the 3D point set 104 projected to that pixel of the synthetic image data 110. To fill in the void pixels, an interpolation method can be used that first looks for opposite neighbors in a neighborhood of the pixel (pixels contiguous with the pixel or less than a specified number of pixels away from the pixel). An average value (e.g., a mean, median, mode, or other average value) of all such pixels can be used for an intensity value for the uninitialized pixel. If no opposite neighbors exist, the intensity can be set to a mean intensity of all neighbors. If the neighborhood contains no initialized pixels, then a mean intensity of an outer ring or other pixels of a larger neighborhood can be used as the intensity value for the pixel. If the larger neighborhood (e.g., a 5×5 with the pixel at the center) is empty, then the pixel intensity can be set to 0 to indicate it is a void pixel. The interpolation process can be run iteratively to fill in additional void pixels. Void pixels may remain after the interpolation process, but the registration process and further applications are designed to handle such voids.

At operation 112, tie points (TPS) 114 can be identified in the synthetic image data 110. A TP is a four-tuple (row from synthetic image data 110, column from synthetic image data 110, row of the image 102, column of the image 102) that indicates a row and column of the image 102 (row, column) that maps to a corresponding row and column of the synthetic image data 110 (row, column).

The operation 112 can include operating an edge-based technique on an image tile to generate an edge pixel template for the synthetic image data 110 to be correlated with the gradient of image 102. An edge pixel template can include a gradient magnitude and phase direction for each edge pixel in an image tile. The edge pixel template can include only high contrast edges (not in or adjacent to a void in the synthetic image data 110). Alternatives to edge-based correlation techniques include fast Fourier transform (FFT), or normalized cross correlation (NCC), among others.

In some embodiments, the operation 112 can include a two-step process, coarse registration followed by fine registration. The coarse registration can operate on image tiles (subsets of contiguous pixels of the synthetic image data 110). When the synthetic image data 110 is formed it may be quite misaligned with the image 102 due to inaccuracy in the geometric metadata associated with the image 102. A registration search uncertainty can be set large enough to ensure that the synthetic image data 110 can be registered with the image 102. The term coarse registration offset means a registration offset that grossly aligns the synthetic image data 110 with the image 102. To make the registration efficient and robust an initial registration can determine the coarse registration offset and remove the same. The fine registration can then operate within a smaller uncertainty region. The coarse registration can employ a larger uncertainty search region to remove a misalignment error, or misregistration, between the synthetic image data 110 and the image 102. Fine registration can use a smaller image tile size (and image template size) and a smaller search region to identify a set of TPS 114. The TPS 114 can be converted to CPs at operation 116. The fine registration can be performed after correcting alignment or registration using the coarse registration.

In both registration steps, the same technique may be used to independently register each image tile. The fine registration can use a smaller tile size and a smaller search region. The operation 112 can include identifying pixels of the synthetic image data 110 corresponding to high contrast edge pixels. Identifying pixels of the synthetic image data 110 corresponding to high contrast edge pixels can include using a Sobel, Roberts, Prewitt, Laplacian, or other operator. The Sobel operator (sometimes called the Sobel-Feldman operator) is a discrete differentiation operator that computes an approximation of the gradient of an intensity image. The Sobel operator returns a gradient vector (or a norm thereof) that can be converted to a magnitude and a phase. The Roberts operator is a discrete differentiation operator that computes a sum of the squares of the differences between diagonally adjacent pixels. The Prewitt operator is similar to the Sobel operator. The operation 112 can include correlating phase and magnitude of the identified high contrast edge pixels, as a rigid group, with phase and magnitude of pixels of the image 102.

To ensure that not all the edge pixels in the tile are running in the same direction (have gradients with same phase), the operation 112 can include computing two thresholds on the gradient magnitude, one for pixels whose gradient phase is near a principal phase direction and one for pixels not in the principal phase direction. The threshold for edges not in the principal phase direction can be lower than the threshold for edges in the principal phase direction. Edge correlation of the operation 112 can include summing over all the high contrast edge pixels of the gradient magnitude of the image times the gradient phase match between the synthetic image data 110 and the image 102.

Edge pixels associated with voids in the synthetic image data 110 can be suppressed and not used in the correlation with the image 102. The image 102 has no voids so the gradients of all pixels of the image 102 can be used.

One aspect of the method 100 is how the TPS 114 from coarse or fine registration are used to determine an offset for each tile between the synthetic image data 110 and the image 102. A synthetic image edge pixel template can be correlated as a rigid group (without rotation or scaling, only translation) with a gradient magnitude and phase of the image 102. A registration score at each possible translation offset can be a sum over all template pixels of an image gradient times a phase match. While the method 100 is tolerant to blunders in the correlation of individual tiles, an offset from the coarse registration must be calculated correctly or there is a risk of not being able to perform fine registration. Since the fine registration can use a smaller search radius, an error in the offset may cause the correct correlation location to be outside the search radius of the fine registration, therefore causing fine registration to be unable to correlate correctly. The blunder metrics, offset checking, and further details of the operations 112, 116 are discussed elsewhere herein.

At operation 116, the TPS 114 are converted to CPS 118 using the 3D point set 104 from which the synthetic image data 110 was produced. The CPS 118 are five-tuples (row of the image 102, column of the image 102, X, Y, and Z) if the image 102 is being registered to the 3D point set 104 (via the synthetic image data 110). The CPS 118 can include an elevation corresponding to a top of a building. A CP 118 corresponds to a point in a scene. The registration provides knowledge of the proper point in the 3D point set 104 by identifying the point that corresponds to the location to which the pixel of the synthetic image 110 is registered.

The TPS 114 can be associated with a corresponding closest point in the 3D point set 104 to become CPS 118. The TPS 114 can be associated with an error covariance matrix that estimates the accuracy of the registered TP 114. An index of each projected 3D point from the 3D point set 104 can be preserved when creating the synthetic image data 110 at operation 108. A nearest 3D point to the center of a tile associated with the TP 114 can be used as a coordinate for the CP 118. The error covariance can be derived from a shape of a registration score surface at a peak, one or more blunder metrics, or a combination thereof.

In some embodiments, at operation 120, the geometry of the image 102 can be adjusted (e.g., via a least squares bundle adjustment, or the like) to bring the image 102 into geometric alignment with the synthetic image data 110. The geometric bundle adjustment can include a nonlinear, least squares adjustment to reduce (e.g., minimize) mis-alignment between the CPs 118 of the image 102 and the synthetic image data 110.

This adjusted geometry could be used for the synthetic image data 110 as well, except the synthetic image data 110 may be of poorer resolution than the image 102 and may not be at the same absolute starting row and column as the image 102. The adjusted geometry of the image 102 can be used to create a projection for the synthetic image data 110 that is consistent with the absolute offset and scale of the synthetic image data 110.

In some embodiments, after the operation 120 converges, the geometry of the image 102 can be updated to match the registered control. As long as the errors of the TPS 114 are uncorrelated, the adjusted geometry is more accurate than the TPS 114 themselves. A registration technique using CPS (e.g., a known XYZ location and a known image location for that location) can be used to perform operation 120. From the CPS 118, the imaging geometry of the image 102 can be updated to match the geometry of the CPS 118.

Adjusting the geometry of the image 102 (the operation 120) is now summarized. Image metadata can include an estimate of the sensor location and orientation at the time the image was collected, along with camera parameters, such as focal length. If the metadata was perfectly consistent with the 3D point set 104, then every 3D point would project exactly to the correct spot in the image 102. For example, the base of a flagpole in the 3D point set 104 would project exactly to where one sees the base of the flagpole in the image 102. But, in reality, there are inaccuracies in the metadata of the image 102. If the estimate of the camera position is off a little, or if the estimated camera orientation is not quite right, then the 3D point representing the base of the flagpole will not project exactly to the pixel of the base in the image 102. But with the adjusted geometry, the base of the flagpole will project very closely to where the base is in the image 102. The result of the registration is adjusted geometry for the image 102. Any registration process can be used that results in an adjusted geometry for the image 102 being consistent with the 3D point set 104.

Figure 2:
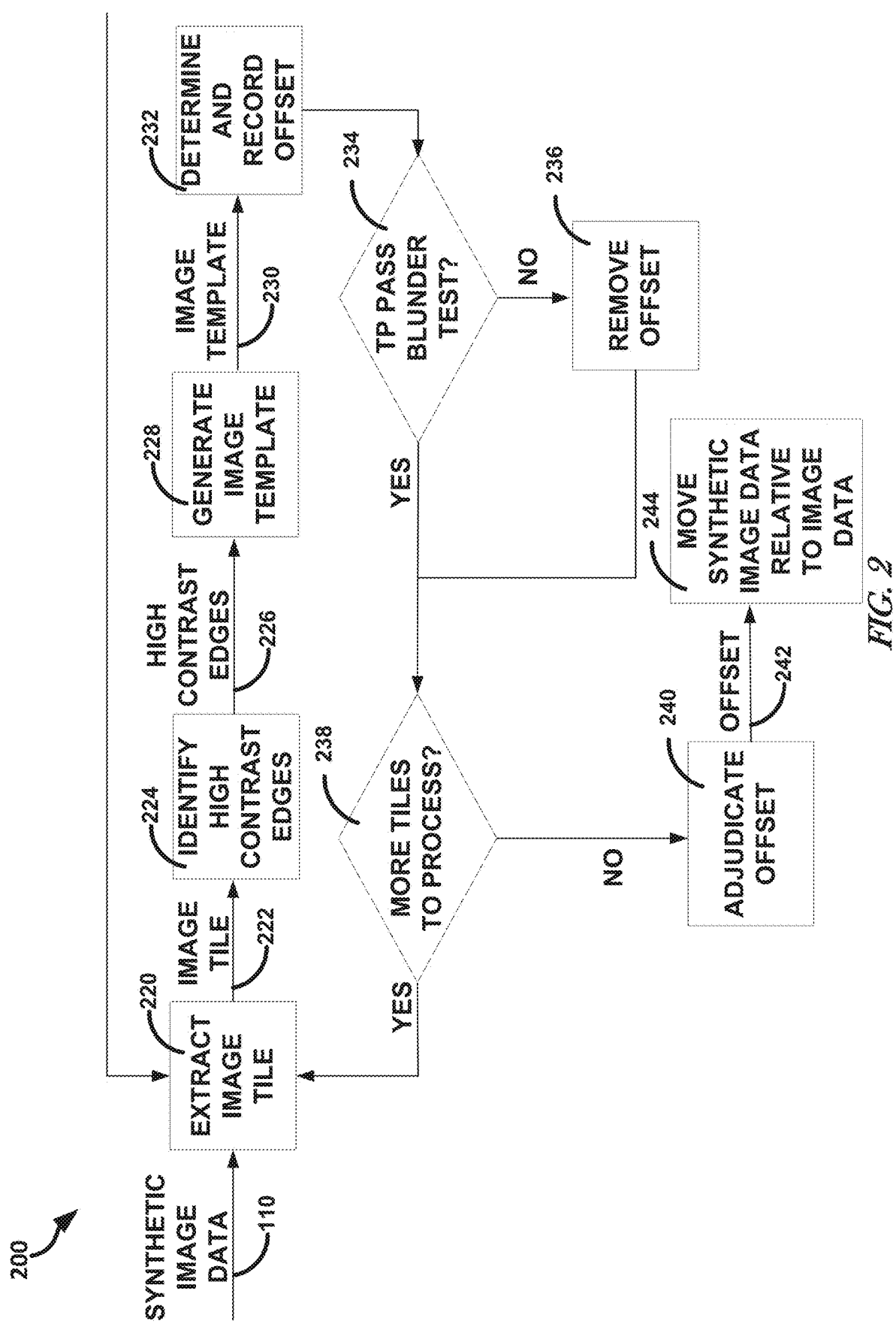
FIG. 2 illustrates, by way of example, a diagram of an embodiment of a method for registering the synthetic image data to the image.

FIG. 2 illustrates, by way of example, a diagram of an embodiment of a method 200 for registering the synthetic image data 110 to the image 102. At operation 220, an image tile 222 is extracted from the synthetic image data 110. The image tile 222 is a proper contiguous subset (less than the whole) of the synthetic image data 110 that is a specified number of rows of pixels by a specified number of columns of pixels. The number of rows and columns can be a same or different number.

At operation 224, high contrast edges 226 of the image tile 222 are identified. The operation 224 can include using a gradient magnitude histogram and a phase histogram. A desired percentage set to a first threshold (e.g., 90%, 10%, 11%, 12%, 15%, a larger or smaller percentage, or some other percentage therebetween) for template sizes less than a specified size (e.g., 16,384 pixels (e.g., 128×128 pixels, or other number of pixels) and smaller) and a second, smaller threshold for larger templates sizes (e.g., 4%, 5%, 6%, a larger or smaller percentage, or some other percentage therebetween). It can be beneficial to use high contrast edge pixels whose edge directions (phases) are not all similar to each other. If the high contrast edges pixels had the same phase, there would be reliable registrability in the direction perpendicular to the edge direction, but not along the edge. So, the first step in determining which edge pixels to use in the template can include histogramming the gradient phase over all the pixels in the template image (e.g., using the gradient magnitude as the weight for each pixel when adding it to the histogram bin). Using a two-pane window each a specified number of degrees (e.g., 5, 10, 15, or other number of degrees) wide and 180 degrees apart, a sum over the histogram can be performed to find the highest window sum. The center of the pane with the highest sum can be set to be the principal phase direction. The pixels can be split into two sets, those whose phases are within +/−45 degrees (modulo 180) of the principal phase direction and those that are not. An interval larger or smaller than +/−45 degrees can be used. A different gradient magnitude threshold can be set for each set.

It can be desired to provide about half of the total high contrast edge pixels from each of the two sets. To do this for a particular set, the gradient magnitude over all the pixels in that set can be histogrammed. The gradient magnitude threshold can be identified at which a percentage of the total of high contrast edge pixels is realized. After the two thresholds are established, all the pixels from each set that are below the threshold are removed from the template. There are at least two reasons that edge based registration provides better results than FFT or NCC. First, the synthetic image data 110 usually has a significant number of voids due to voids in the 3D point set 104. These voids are not handled effectively by FFT and NCC correlation, even when a hole-filling algorithm is performed. The second reason is the ability to register to multiple sensor types using edge-based TP identification. The sensor types can include daytime panchmmatic and MSI, IR, SAR, nighttime EO, or the like. The FFT and NCC correlation methods are not effective when the synthetic image intensities are from a different sensor modality than that of the image being registered. In contrast, an edge-based correlation method is effective across sensor modalities.

At operation 228, an image template 230 can be generated. The image template 230 is the same size as the image tile and includes only those pixels corresponding to the identified high contrast edges at operation 224.

At operation 232, an offset between an initial location estimate of the image template 230 in the image 102 and a location indicated by a phase and magnitude of edges in the image 102 can be determined. The initial location estimate can be determined based on the projection of the 3D point set 104 to the image 102 in the generation of the synthetic image data 110. The X and Y of the 3D point set 104 can be adjusted based on the geometry of the image 102 to generate the location estimate.

For each pixel in the image template 230 there are at least three values: 1) its row value in the template; 2) its column value in the template; and 3) its gradient phase. As previously discussed, there is an initial estimate of where this template is in relation to the image 102 to which the image 102 is being registered. The search range is of delta row offsets and delta column offsets that the image template 230 is rigidly moved around in and compared to the gradient magnitude and phase of the image 102. At each offset, the template pixels will fall on a particular set of pixels in the registration image 102.

To compute the metric for measuring how good the correlation is at that the current offset, a computation, for each pixel in the template, of the gradient magnitude at the pixel in the image 102 corresponding to the current offset times the phase match between the gradient phase of the template pixel and the gradient phase of the image pixel. The phase match can be 90 minus the absolute difference in the two phase directions. For example, if the template phase at the pixel is 37 and the phase at the corresponding pixel in the image is 30, the absolute phase difference would be 7 and the phase match value would be 90-7=83. For cross sensor applications, the gradient can be pointing in the exact 180 degree opposite direction to the edge in the synthetic image data 110. This can be accounted for. For example, if the image 102 had a phase of 217, the absolute difference would be 187. Since the difference is greater than 90 we subtract off 180 to still get a difference of 7. The phase difference factor in the registration can be 90 minus the difference or another function of the difference. This process allows edges running in the same direction but with opposite phase to have a large phase match value. The phase match can be used to lower the weight of the contribution (in the sum) of pixels whose edge directions are very different from the template pixels. The score at each offset can be the sum over all the pixels of the template at that offset of the gradient magnitude times the phase match. The offset with the highest score can be taken to be the correct registration offset.

At operation 234, it can be determined whether a TP of the image tile 222 passes a blunder test. Several metrics (blunder metrics) may be used to assess the quality of the TPS 114 and to identify blunders (sources of error). A blunder metric (whose thresholds can be sensor dependent) can include a) a registration score, b) peak sharpness as the ratio of the score at the second highest peak to the highest score, c) an average gradient magnitude over all the edge pixels at the registered location, d) an average gradient phase match over all the template edge pixels at the registered location, e) a difference between a tile's registration offset and a median offset computed based on all TPS 114, or f) an average (e.g., a weighted average) gradient phase match. The weighted average, gradient magnitudes can be used as the weights. Another metric that may be used is the difference between a registration offset of the image tile 222 and a median offset computed from all TPS 114.

If the identified candidate TP passes the blunder test at operation 234, the TP can be added to a set of trusted TPS. If the TP does not pass the blunder test, the offset can be discarded at operation 236. This means that the image tile 222/image template 230 is not used in registering the synthetic image data 110 to the image 102. At operation 238, it can be determined if there are more tiles to process. The operation 220 can then be performed to get a next image tile 222 if there are more tiles to process. Otherwise, operation 240 can be performed.

The operation 240 can adjudicate between estimates of the correct offset. Note that for each trusted image tile, an offset is estimated, so the operation 240 attempts to determine which offset is the most correct. A least squares affine transformation can be computed from all trusted TPS. A trusted TP is one that passes the blunder metrics at operation 234. Note that a least squares calculation is sensitive to blunders. If blunders have slipped through, an affine transformation between CPs 118 can be negatively impacted. An estimate of an offset can be computed using a median (e.g., weighted median) of the individual offsets from the trusted tiles. The weight for each TP 114 can be a function of one or more blunder metrics above. Finally, a third estimate of the gross offset may be computed by combining the registration scores of all the trusted tiles at each offset into one unified total score. The offset with the maximum unified score can be another gross offset estimate. A determination of which offset is correct can be performed only in coarse registration and not in fine registration. For fine registration, each tile is registered independently and gets its own offset. All tiles that pass the blunder thresholds can be converted to CPS and used in the geometric bundle adjustment.

An adjudication to determine the correct offset, at operation 240 can include determining a median TP offset, an affine transformation computed based on the trusted TPs, and an offset associated with a top peak from a combined score surface of all TPs. To determine the trustworthiness of the offset, the maximum offset from the peak whose score is at least a specified percentage (e.g., 70%, 75%, 80%, 85%, 90%, 95%, 99%, a greater or lesser percentage, or some percentage therebetween) of a maximum correlation score may be computed. If the maximum offset is more than a specified threshold of a search radius (e.g., 25%, 50%, 75%, 80%, 85%, 90%, 95%, or a greater or lesser percentage), then the maximum combined score offset can be considered untrustworthy and discarded. If the distance is less than, or equal to, the specified threshold, the offset can be considered to pass the test and be used to determine a final offset value. If the determined offset passes the test, a median TP offset may be determined. If the median TP offset value is at least a specified percentage (e.g., 70%, 75%, 80%, 85%, 90%, 95%, 99%, a greater or lesser percentage, or some percentage therebetween) of the maximum score, then the median offset can replace the combined score offset. The offset computed from an affine transformation at the center of the image can be compared against the chosen offset. If the affine transformation produces a smaller shift, then the affine transformation offset can be selected as a correct offset 242. At operation 244, the synthetic image data 110 can be moved relative to the image 102 by the gross offset 242 prior to performing fine registration.

In some embodiments, the operation 240 can include determining whether an offset is trustworthy. The operation 240 can include determining whether the offset is less than a threshold offset. If not, the offset can be discarded. If so, the offset can be further adjudicated. An estimate of a gross offset can be computed using a median (e.g., weighted median) of the individual offsets from the trusted tiles.

To determine the trustworthiness of the gross offset of the combined registration score surface, the maximum offset distance from the peak whose score is at least 90% of a maximum correlation score may be computed. If the distance is more than a specified threshold of the search radius (e.g., 25%, 50%, 75%, 80%, 85%, 90%, 95%, or a greater or lesser percentage), then the maximum combined score offset can be considered untrustworthy. If the distance is less than, or equal to, the specified threshold, the offset can be considered to pass the test. If the distance passes the test, a median TP offset may be used. If this value is at least 95% of the maximum score, then the median offset replaces the combined score offset. The offset computed from an affine transformation at the center of the image can be compared against the chosen offset. If the affine transformation produces a smaller offset, then the affine transformation offset can be selected.

An affine transformation between the image 102 and the synthetic image data 110 can be identified or determined, such as based on the TPS 114. The affine transformation can be determined using a least squares fit to the TPS 114 between the image 102 and the synthetic image data 110. The result of the affine transformation indicates the pixel in the other image corresponding to a given pixel in a source image.

An affine transformation is a linear mapping that preserves points, straight lines, planes. That is, parallel lines in a source image remain parallel after an affine transformation to a destination image. Different affine transformations include translation, scale, shear, and rotation.

The method 200 can be performed one, two, or more times. In some embodiments, each consecutive performance of the method 200 can use a smaller image tile 222 (and corresponding search radius) that is smaller than in an immediately prior performance of the method 200.

As previously mentioned, after coarse registration results (a first pass of the method 200) are applied, a fine registration can be performed using a smaller search region. The same registration method 200 (including blunder metrics) can be applied. The TPS 114 that pass the blunder metrics can be converted to CPS 118 using the closest projected 3D point to the center of the tile. Each point in the 3D point set 104 has an intensity associated with the point. When a point (via the geometry of the image 102 we are registering to) of the 3D point set 104 is projected to a pixel in the synthetic image data 110, that point will, very likely, not project exactly to the center of a pixel. Whatever pixel of the synthetic image data 110 it projects to is associated with an intensity associated with the point. The synthetic image data 110 can retain a point identification of the point whose intensity was used to fill in the pixel. Because the 3D point set 104 may be irregularly spaced and have voids not every pixel may get filled in. Each empty pixel of the synthetic image data 110 can be provided with an intensity derived from the neighbors that are filled. If the pixel has no nearby neighbors that are filled in (which can happen for large voids in the point set), that pixel can be left empty and not used in the registration. When registering an edge template to the image 102, a center of the template is a convenient location from which to get a CP, but the center pixel may have been a pixel that did not have a 3D point that projected to it. In such cases, a pixel closest to the center that did have a point projected to it can be used for the CP. The X, Y, and Z of that point can be used as a location of the CP. The image location of CP can be shifted to be commensurate with the pixel being used in the CP. The image location can be further moved (in a subpixel fashion) to account for where inside the pixel the point actually projected. For example, the 3D point may have projected to a point a seventh of a pixel row above the center of the pixel and a quarter of a pixel column to the right of the center of the pixel. The image location can be shifted with these subpixel row and column adjustments to correspond to actual projected point.

The error covariance may be derived from the shape of the registration score surface at the peak and the quality metrics. The registration scores in a neighborhood centered at a top scoring offset location can be used to calculate the error covariance. The following method can be used. This method is described using a radius of three (3), but other radius values can be used. A radius of three (3) results in a 7×7 region centered at the location of top scoring offset. For the 7×7 region centered at the top scoring offset a minimum score can be determined. This score is subtracted off each score in the 7×7. Three sums can be determined using the 7×7. A first sum (sum1) can the sum over all the offsets in the 7×7 of the score at that offset times the square of the column difference of that offset with the center of the 7×7. As second sum (sum2) can be the score at that offset times the square of the row difference of that offset with the center of the 7×7. A third sum (sum3) can be the score at that offset times the column difference of that offset with the center of the 7×7 times the row difference of that offset with the center of the 7×7. The three sums can be divided by the sum of the scores over the 7×7 region. Let scoreSum denote the sum of the scores over the 7×7 region. These values are computed in the space of the registration image, which may not have been performed at the full resolution of the image and may need to be scaled to full resolution. Let ratioCol be the ratio of the X scale of the registration image in the column direction to the scale of the image in the column direction. Let ratioRow be the analogous ratio in the Y direction. The covariance for the CP image location is stored as an upper triangular 2×2 matrix (i.e. three values) where covar[0]=the square of ratioCol×Sum1/scoreSum, covar[1]=ratioCol×ratioRow×Sum3/scoreSum, covar[2]=the square of rowRatio*Sum2/scoreSum.

If the application of the blunder thresholds retains too few CPs, the blunder thresholds can be iteratively relaxed until a sufficient number of CPs are retained. The threshold values used to reduce blunders can be sensor dependent. In an example, if the number of TPS 114 that pass the blunder rejection are below a minimum number of TPS 114, the metrics may be relaxed, such as to achieve a specified minimum number of TPS 114.

Figure 3:
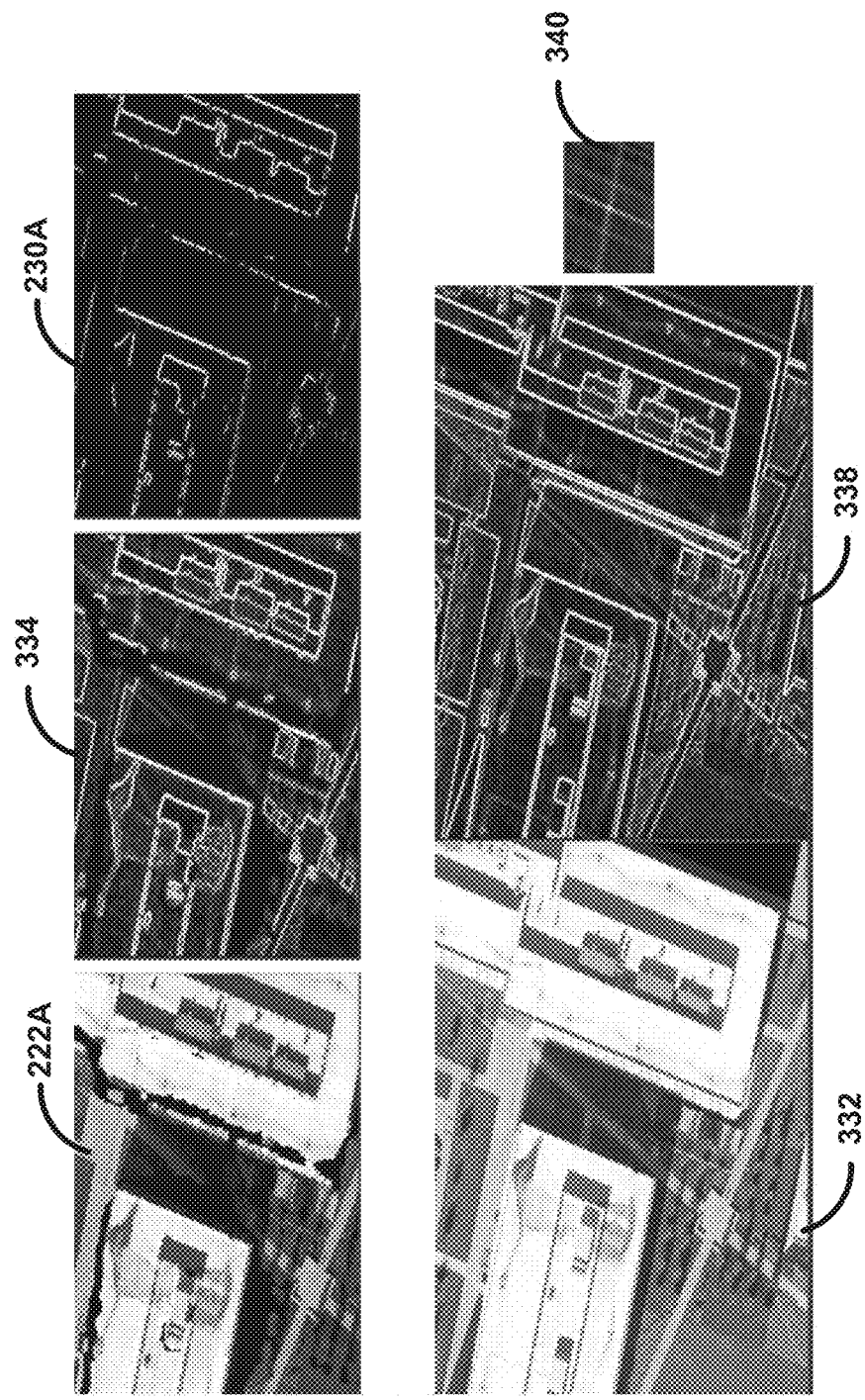
FIG. 3 illustrates, by way of example, grayscale image chips of an edge-based registration of an image tile.

FIG. 3 illustrates, by way of example, grayscale image chips of an edge-based registration of an image tile. The image chips include views of a point cloud and image of a portion of Richardson, Tex. The upper row of image chips shows the tile from a synthetic image tile 222A, a gradient magnitude from a Sobel operator in image chip 334, and high contrast edge pixels selected to use in the registration in image template 230A. The Sobel gradient operator can be used to generate gradient magnitude and phase for both the synthetic image tile 222A and an image tile 332. The image tile 332 includes a proper subset of the pixels of the image 102. The lower row of images in the figure shows the image tile 332 to which to register, its Sobel gradient magnitude in image chip 338, and a registration score resulting from correlating the high contrast synthetic image edges with the gradient from the image being registered at an image chip representing the correlation score 340. The image tile 332 is larger than the synthetic image tile 222A because it must accommodate the template size of the synthetic image tile 222A plus the registration search radius (to account for error). The correlation score 340 (at each offset) indicates that the highest correlation of the high contrast edges occurs with the center point of the synthetic image tile 222A projected to a pixel below center and right of center in the image tile 332. The process of FIG. 2 can be repeated using a tile of a smaller size and a smaller search region to get an even better correlation of the high contrast edges.

Figure 4:
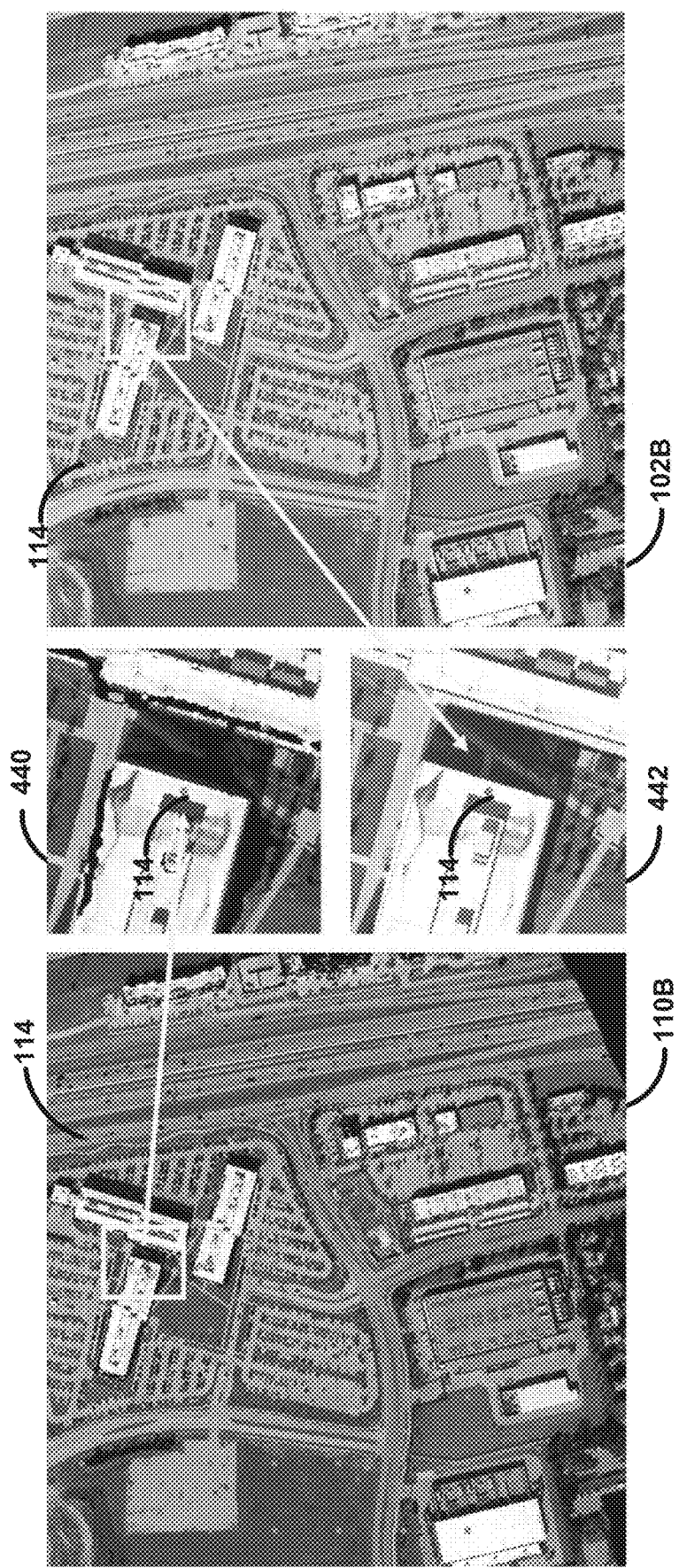
FIG. 4 illustrates, by way of example, TPS between the image and a synthetic image data.

FIG. 4 illustrates, by way of example, TPS 114 between the image 102 and a synthetic image data 110. In FIG. 4, the TPS 114 identified between a synthetic image data 110B and an image 102B for an image of a portion of Richardson, Tex. are shown. FIG. 4 illustrates a first image tile 440 from the synthetic image data 110B, a second image tile 442 from the image 102B.

Figure 5:
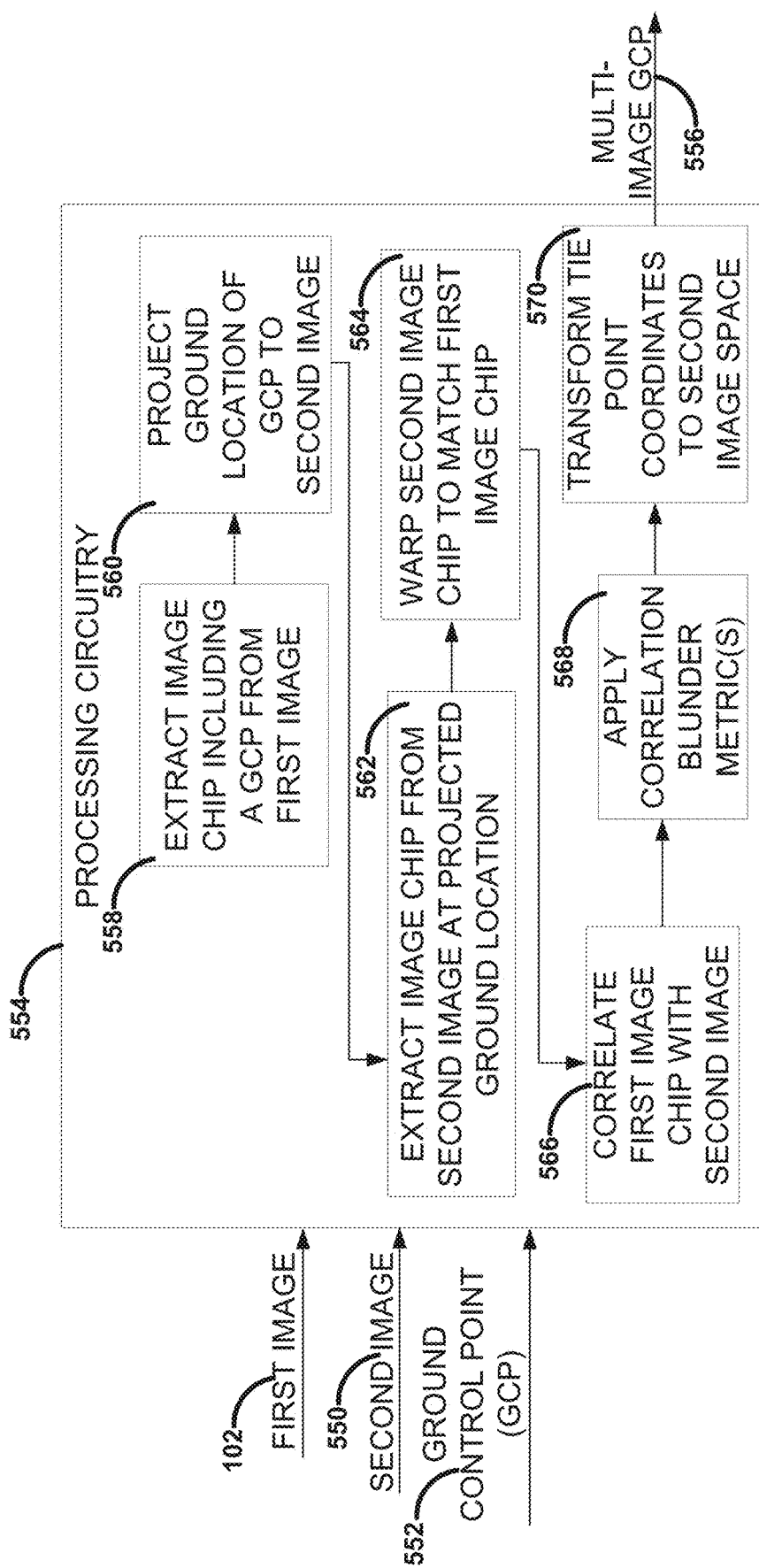
FIG. 5 illustrates, by way of example, a logical flow diagram of an embodiment of a system and method for generating multi-image GCPs.

FIG. 5 illustrates, by way of example, a logical flow diagram of an embodiment of a system and method for generating multi-image GCPs. The system as illustrated includes processing circuitry 554 that receives, as input, the first image 102, a second image 550, and GCPs 552. The processing circuitry 554 can generate, as output, multi-image GCP data 556. The first image 102 has been registered to the 3D point cloud 106. The GCPs 552 are provided as part of registering the first image to the 3D point cloud 106. Examples of such a registration process are provided regarding FIGS. 1-4. The GCPs 552 include a five-tuple that associates a point in the 3D point set 104 with a pixel of the first image 102. An example of the five-tuple is (line, sample, x, y, z). The multi-image GCP 556 includes five entries (a five-tuple) plus two additional entries for each image beyond the first image 102 that has a pixel associated with the GCP 552. A list of images can be generated that indicates which images are included in the multi-image GCP. The list of images can be sequential, such that a first image in the list indicates the image that the first instance of (line, sample) in the entry is associated with, a second image in the list indicates the image the second instance of (line, sample) in the entry is associated with, and so on. In the example of FIG. 5 in which only two images are associated with the GCP 552, the multi-image GCP 556 includes a seven-tuple (line1, sample1, line2, sample2, x, y, z), where line1, sample1 are the row and column corresponding to the pixel associated with the GCP 552 in the first image 102 and line2, sample2 are the row and column corresponding to the pixel associated with the GCP 552 in the second image 550.

The first image 102 and the second image 550 have an overlapping field of view. That is, the first image 102 and the second image 550 include a view of a same geographical location. The first image 102 and the second image 550 can be taken from different perspectives. A different perspective can include a different viewing angle, a different viewing location, a different elevation, a combination thereof, or the like.

The processing circuitry 554 can be configured to implement the method for generating the multi-image GCP 556. The processing circuitry 554 can include hardware, software, firmware or a combination thereof. The hardware can include electric or electronic components. Electric or electronic components can include one or more resistors, transistors, capacitors, diodes, inductors, logic gate (e.g., AND, OR, XOR, negate, or the like), memory devices (e.g., random access memory (RAM), read only memory (ROM), programmable ROM (PROM), erasable PROM (EPROM), flash memory, or the like), a processor (e.g., a central processing unit (CPU), field programmable gate array (FPGA), application specific integrated circuit (ASIC), graphics processing unit (GPU), or the like), regulators (e.g., voltage, current, power, or the like), multiplexers, switches, modulators, demodulators, analog to digital or digital to analog converters, or the like.

The method implemented by the processing circuitry 554 can include one or more of the operations 558, 560, 562, 564, 566, 568, and 570. The operation 558 can include extracting an image chip that includes a GCP (of the GCPs 552) from the first image 102. An image chip is a portion of the first image 102 that includes a pixel that includes the GCP.

FIG. 6 illustrates, by way of example, a diagram of an embodiment of the operation 558. The first image 102 includes pixels 660, 662, 664 and corresponding intensity data. Intensity data can include one or more of a black, white, red, green, blue, yellow, infrared, or other intensity value. Each of the pixels 660, 662, 664 of the image 102 include an associated line (row) and sample (column). The GCP 552 indicates the line and sample of the first image 102 associated with the point of the 3D data set 104 corresponding to the x, y, z of the GCP 552. A first image template 666 can include the GCP 552 contained therein. The first image template 666 can include pixels from the first image 102. In the template 666, the center pixel can be associated with the GCP 552. In embodiments, the first image template 666 can include a 3×3, 5×5, 7×7, 3×5, 5×7, or the like, grid of pixels from the first image 102.

FIG. 7 illustrates, by way of example, a diagram of an embodiment of the operation 560. The operation 560 can include projecting a ground location of the GCP 552 to the second image 550. The operation 560 can include projecting other points from template 666 to the ground 770. The ground 770 can be the ground plane at the z-value of the GCP 552. The operation 560 can include projecting the GCP 552 to ground 770 and then projecting that point to the second image 550. Projecting can include projecting the pixels to the corresponding z location of the GCP 552 (the ground 770) to a ground projected location 772. The ground projected location 772 can be projected to the second image 550. The projection to the ground 770 or the second image 550 can be through the image geometry. The image geometry is usually provided in metadata of the image 102, 550. The image geometry can be specified by a rational polynomial coefficient, a replacement system model (RSM), or the like. The image geometry of the first image 102 can be used to project the GCP 552 to the ground 770 to determine the ground projected location 772. The image geometry of the second image 550 can be used to project the ground projected point 772 to a pixel 774 of the second image 550.

The points projected to the ground 770 and then to the second image 550 provide correspondences between the first image 102 and the second image 550. An affine transformation can be determined with just 3 non-colinear points, but using a least squares fit to a set of equally spaced points covering the correlation region can perform better. The correspondences can be used to fit (e.g., via least squares) an affine transformation that maps the first image 102 to the second image 550. Note that knowing the elevation of the location, which is provided by the GCP 552, allows for a smaller registration search radius than would be possible under more general circumstances.

FIG. 8 illustrates, by way of example, a diagram of an embodiment of the operation 562. The operation 562 can include extracting an image chip (a second image template 880) from the second image 550. The second image template 880 can include the pixel 774. The pixel 774 can be at the center of the second image template 880. The size (number of pixels) of the template 880 can be larger than the first image template 666. The size of the template 880 can help account for errors in performing the operation 560. The errors can include the geometry of each of the images and the z location from the GCP location. There can be error in the GCP location as it was derived from the 3D point cloud. The size of the template 880 can help ensure that the first image template 666 correlates to an accurate location within the second image template 880. As previously discussed, knowing the elevation (z-value) of the GCP 552 reduces the search area to be smaller than would be required if the elevation was unknown.

FIG. 9 illustrates, by way of example, a diagram of an embodiment of the operation 564. The operation 564 can include warping the second image template 880 to match the geometry of the first image 102. Warping can account for a difference in scale in each axis of the two images, such as the ground sampled distance (GSD) difference of the image axes, and an orientation difference, or the like between the first image 102 and the second image 550. Warping the second image 550 can include applying an affine transformation determined based on the correspondences between points of the first image template 666 and the second image 550 as discussed regarding operation 558.

An affine transformation can be identified or determined, such as based on the geometric tie points. The affine transformation can be determined using a least squares fit to the geometric tie points between the first image 102 and the second image 550. One of the images 102, 550 can then be transformed to the image space of the other image, such as by applying the identified or determined affine transformation to each pixel. The result of the affine transformation indicates the pixel in the other image corresponding to a given pixel in a source image. Since the affine transformation does not project a destination pixel exactly to the center of a pixel in the source image, bilinear, or other interpolation, can be applied to the intensities of a set of pixels to determine a more accurate value for the intensity data.

An affine transformation is a linear mapping that preserves points, straight lines, planes. That is, parallel lines in a source image remain parallel after an affine transformation to a destination image. Different affine transformations include translation, scale, shear, and rotation. The affine transformation of the operation 564 can translate a location in the second image 550 to a location in the first image 102.

The operation 566 (see FIG. 5) can include correlating the first image template 666 with the warped second image template 990. The operation 566 can include performing a normalized cross correlation (or other correlation, such as a fast Fourier transform (FFT), a least squares correlator, an edge correlation, or the like) between the warped second image template 990 and the first image template 666. The second image template 990 can be filled with interpolated intensity values. This is at least partially because the pixels of the warped second image template 990 likely do not align perfectly with the pixels of the first image template 666. The pixel intensities from the second image 550 can be projected to the warped second image template 990 (via the affine transformation). A linear, or other interpolation, can be used to determine pixel intensity values for populating the warped second image template 990.

Intensity values can be normalized before performing cross correlation. Cross correlation can include subtracting an average intensity value and dividing by a standard deviation of the intensity values. The cross-correlation in mathematical terms can include $$1/n \sum_{x,y} \frac{1}{\sigma_f \sigma_t} (f(x,y) - \mu_f)(t(x,y) - \mu_t),$$

where $t(x,y)$ is an image template, $f(x,y)$ is a subimage, n is the number of pixels in $t(x,y)$ and $f(x,y)$, $\mu_f$ is the average intensity in f, $\mu_t$ is the average intensity value in t, $\sigma_f$ is the standard deviation of the intensity values in f, and $\sigma_t$ is the standard deviation of the intensity values of t.

After the pixel intensity values are determined, the operation 566 can be performed. The shape of the correlation score surface at the top scoring offset can be used to determine a subpixel estimate of the true offset. The subpixel estimate can be transformed (via the affine transformation) back to the space of the second image 550.

The operation 568 includes applying one or more blunder metrics to help ensure that the GCP 552 is associated with a best pixel in the second image 550. Ideally, there would be both a high correlation score and a sharp, unambiguous peak at the top score corresponding to the pixel that best matches. The operation 568 can help ensure quality observations. The operation 568 can include a first comparison of the highest correlation score to a first threshold. If the highest correlation score (from operation 566) is less than the first threshold, the pixel location can be discarded and not associated with the GCP 552. The operation 568 can include a second comparison of a ratio of the second highest correlation score (outside a defined distance from the highest correlation score) to the highest correlation score to a second threshold. If the ratio is less than the second threshold, the pixel location can be discarded and not associated with the GCP 552. If the correlation scores pass one or more of the tests, the multi-image GCP passes these blunder checks, it is retained and output along with all the other multi-image GCPs that passed the blunder thresholds.

Figure 10:
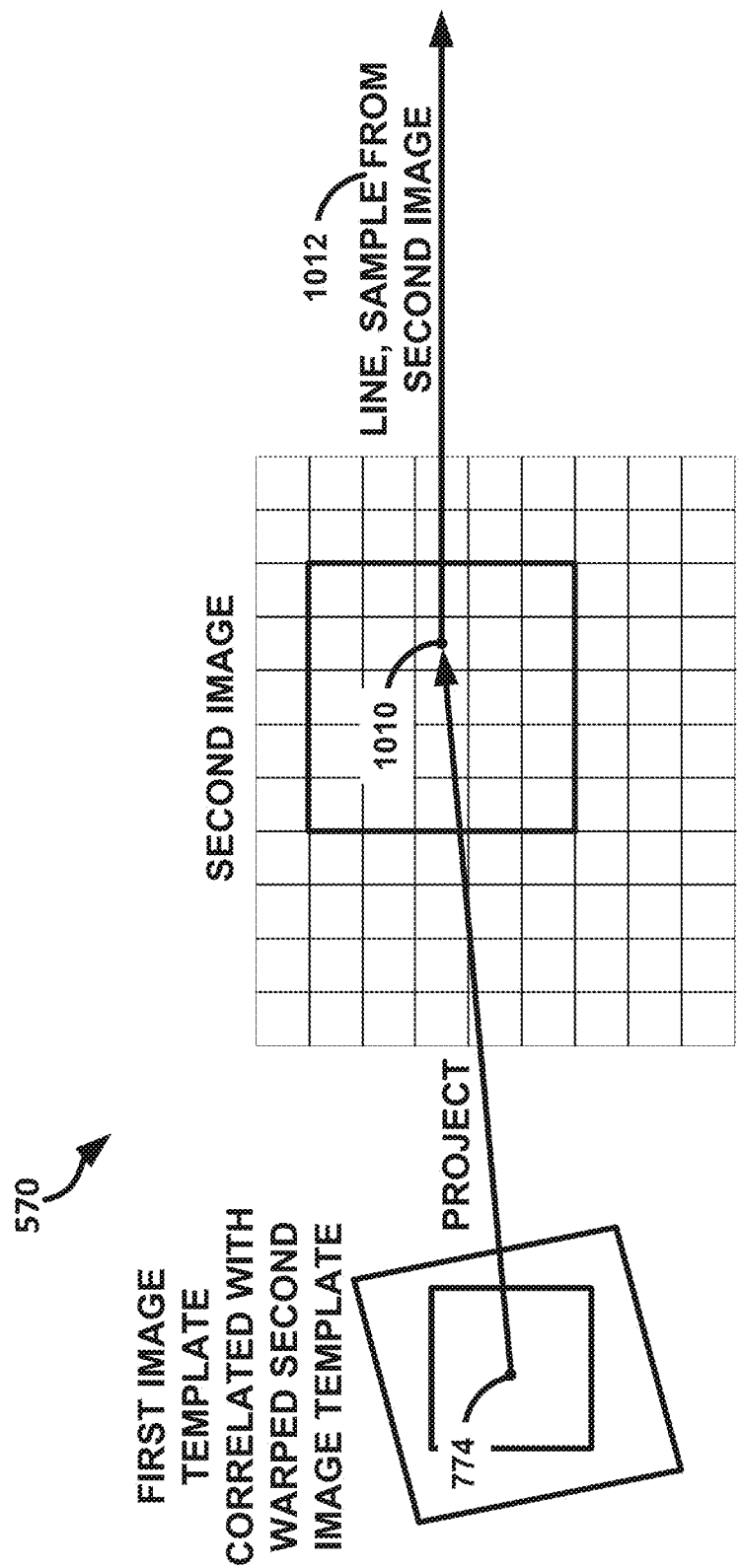
FIG. 10 illustrates, by way of example, a diagram of an embodiment of transforming tie point coordinates to the second image space.

FIG. 10 illustrates, by way of example, a diagram of an embodiment of the operation 570. The operation 570 can include transforming the point coordinates that correspond to the highest correlation score to the space of the second image 550. The operation 570 can include using the image geometry. The operation 570 determines the line, sample coordinates in the second image 550 that correspond to the highest correlation score.

What follows is a description of how to use a 2D quadratic fit to the correlation score array around a peak correlation location to obtain a subpixel estimate of the optimal correlation location. The description describes using a 3×3 set of correlation scores centered at the top scoring location. In practice, a 5×5 set of correlation scores can provide better performance over a 3×3. The formulation for a 5×5, or larger, quadratic fit is analogous to the 3×3 case.

A subpixel estimate of the shift for a correlation can include fitting a quadratic surface to nine data points (e.g., a 3×3 grid with the peak at the center) surrounding the peak via a least squares estimate of the quadratic form coefficients. "Subpixel" in this context refers to estimating a best real-valued estimate of the spatial shift, provided that the best integer-valued shift has already been determined. The quadratic surface can defined as in Equation 1:

$$f(x,y)=a_1+a_2x+a_3y+a_4x^2+a_5y^2+a_6xy \quad \text{Equation 1}$$

The coefficients of this quadratic surface can be solved via a least squares fit to the 3×3 surface surrounding the peak of the correlation surface about $(k_{max}, l_{max})$. To formalize the least squares fit, let the correlation coefficient values about $(k_{max}, l_{max})$ be enumerated as 9 $v_{x,y}$ intensity values as x,y that each range from −1, 0 to +1. The indices can be translated so that the peak is centered at zero and the values for x, y take on the following 9 permutations:

$$x \in \{-1,0,+1\}$$

$$y \in \{-1,0,+1\}$$

The value for the correlation coefficient at the translated x, y coordinates can thus be given as $$v_{x,y}=C_{k_{max}+x,l_{max}+y} \quad \text{Equation 2}$$

The value for the peak itself can be denoted $v_{0,0}$.

The Equation for the least squares solution for the $a_i$ coefficients can be $$[1 \, x \, y \, x^2 \, y^2 \, xy]\begin{bmatrix} a_1 \\ a_2 \\ a_3 \\ a_4 \\ a_5 \\ a_6 \end{bmatrix} = v_{x,y} \quad \text{Equation 3}$$

The least squares observation equation can thus be written $$\underset{9\times 6}{H}\underset{6\times 1}{X} = \underset{9\times 1}{V} \quad \text{Equation 4}$$

with the rows of H representing the evaluated powers of x, y in Equation 3 as their values range over the 9 permutations specified previously. The corresponding row of V can be the associated correlation coefficient $v_{x,y}$ in Equation 3 and X is the solution vector of the 6 $a_i$ coefficients.

The least squares solution can be given as Equation 5:

$$X=(H^TH)^{-1}H^TV \quad \text{Equation 5}$$

A final note is in order regarding boundary conditions. It may be the case that the peak location $(k_{max}, l_{max})$ falls right on the edge of the correlation surface. In this case, one cannot formally translate the (x,y) values of the permutations to be truly centered at the "peak". If such a boundary condition occurs, the corresponding translations can be accommodated to eliminate the boundary condition, such as by choosing the 3 points nearest the boundary, as contrasted with centered on the peak, or the like.

Since the integer-valued peak has been determined to lie above all of the surrounding points, the quadratic surface must have a global maximum within the 3×3 region about the peak. The x, y location of this maximum can be a sub-pixel refinement to $(k_{max}, l_{max})$ of the displacement between the template and search window.

The gradient of Equation 1 can be given by Equations 6

$$\frac{\partial f}{\partial x} = a_2 + 2a_4x + a_6y \quad \text{Equation 6}$$

$$\frac{\partial f}{\partial y} = a_3 + 2a_5y + a_6x$$

Setting each equation to zero provides $$\begin{bmatrix} 2a_4 & a_6 \\ a_6 & 2a_5 \end{bmatrix}\begin{bmatrix} x \\ y \end{bmatrix} = \begin{bmatrix} -a_2 \\ -a_3 \end{bmatrix} \quad \text{Equation 7}$$

The location of the peak can be obtained by solving the above system of equations via Cramer's rule as $$x_s = \frac{E}{D} \quad \text{Equation 8}$$

$$y_s = \frac{F}{D} \quad \text{Equation 9}$$

where $$E=-2a_2a_5+a_3a_6 \quad \text{Equation 10}$$

$$F=-2a_3a_4+a_2a_6 \quad \text{Equation 11}$$

$$D=4a_4a_5-a_6^2 \quad \text{Equation 12}$$

Note that in order to bound the solution within the 3×3 area about the peak, the following conditions are checked on the solution vector $[x_s \, y_s]$:

$$|x_s| \leq 1$$

$$|y_s| \leq 1 \quad \text{Equations 13}$$

If either condition in Equations 13 is not met, this is indicative of a maximum location that is not "strongly peaked". In this case, the gradient equation condition from Equation 7 may represent a local maximum or a saddle point and the correlation result can be discarded as "weak" via assignment of an arbitrarily low figure of merit (e.g., zero, negative, or the like).

Otherwise, if the conditions in Equation 13 are met, the subpixel peak real-valued location can be computed as in Equation 14.

$$(k_{max},l_{max})_{subpixel}=(k_{max},l_{max})+(x_s,y_s) \quad \text{Equation 14}$$

The output of the method can include the multi-image GCP 556. The multi-image GCP 556 includes line, sample coordinates from multiple images and a corresponding x, y, z of a point in the 3D data set 104. The multi-image GCP 556 has many practical applications. For example, the multi-image GCP 556 can be used to accurately tie multiple 2D images together at a precise 3D location. The multi-image GCP 556 can be used to assess geo-positional accuracy of the 3D point set if one or more of the 2D images are from a highly accurate source. The determined image coordinates can be used to adjust the 3D point set to the highly accurate source, such as for targeting. The determined image coordinates can be used to register one or more other images to the 3D point set faster than prior techniques.

Figure 11:
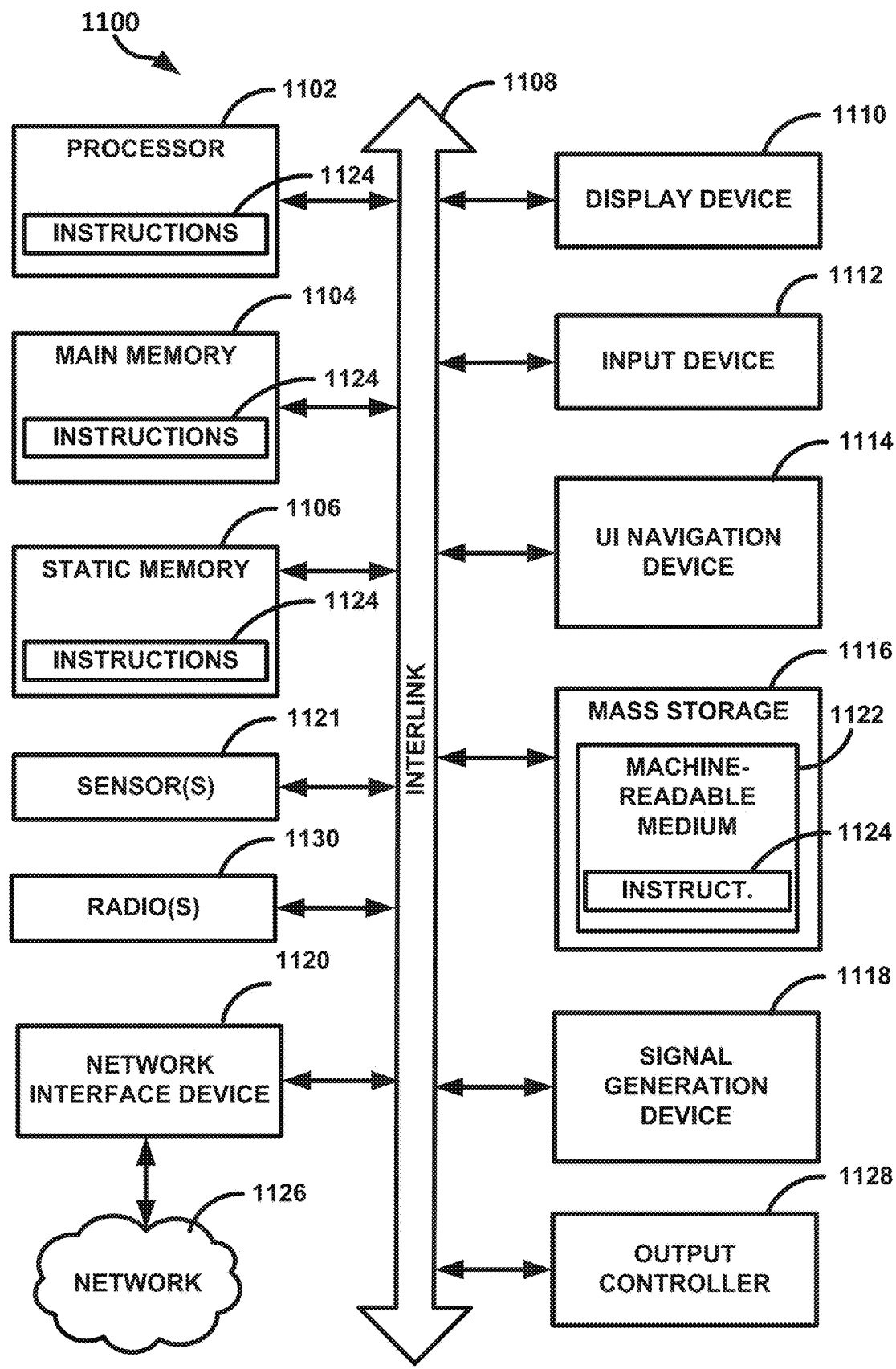
FIG. 11 illustrates, by way of example, a block diagram of an embodiment of a machine in the example form of a computer system within which instructions, for causing the machine to perform any one or more of the methods discussed herein, may be executed.

FIG. 11 illustrates, by way of example, a block diagram of an embodiment of a machine in the example form of a computer system 1100 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a mass storage unit 1116, a signal generation device 1118 (e.g., a speaker), a network interface device 1120, and a radio 1130 such as Bluetooth, WWAN, WLAN, and NFC, permitting the application of security controls on such protocols.

The mass storage unit 1116 includes a machine-readable medium 1122 on which is stored one or more sets of instructions and data structures (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

ADDITIONAL NOTES AND EXAMPLES

Example 1 can include a computer-implemented method for multi-image ground control point (GCP) determination, the method comprising extracting, from a first image including image data of a first geographical region, a first image template, the first image template including a contiguous subset of pixels from the first image and a first pixel of the first image indicated by the GCP, predicting a first pixel location of the GCP in a second image, the second image including image data of a second geographical overlapping with the first geographical region, extracting, from the second image, a second image template, the second image template including a contiguous subset of pixels from the second image and a second pixel corresponding to the pixel location, identifying a second pixel of the second image corresponding to a highest correlation score, and adding a second pixel location of the identified pixel to the GCP.

In Example 2, Example 1 can further include determining respective correlation scores, using a normalized cross-correlation, for the first image template centered at a variety of pixels of the second image template.

In Example 3, Example 2 can further include comparing a highest score of the correlation scores to a first threshold value and discarding the second pixel location if the ratio is less than the second threshold value.

In Example 4, Example 3 can further include comparing a ratio, of the highest correlation score to a second highest correlation score, to a second threshold value and discarding the second pixel location if the ratio is less than the second threshold value.

In Example 5, at least one of Examples 1-4 can further include, wherein the first pixel is the center of the first image template.

In Example 6, at least one of Examples 1-5 can further include, wherein the second pixel is the center of the second image template.

In Example 7, at least one of Examples 1-6 can further include warping the second image template using an affine transformation before identifying the second pixel.

In Example 8, Example 7 can further include projecting the identified second pixel to an image space of the second pixel to determine the second pixel location.

Example 9 can include a non-transitory machine-readable medium including instructions that, when executed by a machine, cause a machine to perform operations for determining a multi-image ground control point (GCP), the operations comprising extracting, from a first image including image data of a first geographical region, a first image template, the first image template including a contiguous subset of pixels from the first image and a first pixel of the first image indicated by the GCP, predicting a first pixel location of the GCP in a second image, the second image including image data of a second geographical overlapping with the first geographical region, extracting, from the second image, a second image template, the second image template including a contiguous subset of pixels from the second image and a second pixel corresponding to the pixel location, identifying a second pixel of the second image corresponding to a highest correlation score, and adding a second pixel location of the identified pixel to the GCP.

In Example 10, Example 9 can further include, wherein the operations further comprise determining respective correlation scores, using a normalized cross-correlation, for the first image template centered at a variety of pixels of the second image template.

In Example 11, Example 10 can further include, wherein the operations further comprise comparing a highest score of the correlation scores to a first threshold value and discarding the second pixel location if the ratio is less than the second threshold value.

In Example 12, Example 11 can further include, wherein the operations further comprise comparing a ratio, of the highest correlation score to a second highest correlation score, to a second threshold value and discarding the second pixel location if the ratio is less than the second threshold value.

In Example 13, at least one of Examples 9-12 can further include, wherein the first pixel is the center of the first image template.

In Example 14, at least one of Examples 9-13 can further include, wherein the second pixel is the center of the second image template.

In Example 15, at least one of Examples 9-14 can further include, wherein the operations further comprise warping the second image template using an affine transformation before identifying the second pixel.

In Example 16, Example 15 can further include, wherein the operations further comprise projecting the identified second pixel to an image space of the second pixel to determine the second pixel location.

Example 17 can include a system comprising:

a memory including image data of first and second images of a geographical region stored thereon and processing circuitry coupled to the memory, the processing circuitry configured to perform the operations of the method of at least one of Examples 1-8.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method for multi-image three-dimensional (3D) ground control point (GCP) determination, the method comprising:
    extracting, from a first two-dimensional (2D) image including image data of a first geographical region, a first image template, the first image template including a contiguous subset of pixels from the first 2D image and a first pixel of the contiguous subset of pixels of the first 2D image indicated by the GCP, wherein the GCP is a five-tuple that associates a point in a three-dimensional (3D) point set with the first pixel of the first image;
    predicting a first pixel location of the first pixel of the GCP in a second 2D image, the second 2D image including image data of a second geographical region overlapping with the first geographical region;
    extracting, from the second 2D image, a second image template, the second image template including a contiguous subset of pixels from the second 2D image and a second pixel of the contiguous subset of pixels of the second 2D image corresponding to the first pixel location;
    determining respective correlation scores, using a normalized cross-correlation, for the first image template centered at a variety of pixels of the contiguous subset of pixels of the second image template;
    comparing a highest correlation score of the correlation scores to a first threshold value;
    discarding a location of the second pixel responsive to determining a ratio is less than the first threshold value;
    identifying an undiscarded highest correlation pixel of the second 2D image corresponding to a remaining highest correlation score; and
    adding a pixel location of the undiscarded highest correlation pixel to the GCP making the GCP a seven-tuple to register the second 2D image to the 3D point set.

2. The method of claim 1, further comprising comparing a ratio, of the highest correlation score to a second highest correlation score, to a second threshold value and discarding the second pixel location if the ratio is less than the second threshold value.

3. The method of claim 1, wherein the first pixel is the center of the first image template.

4. The method of claim 1, wherein the second pixel is the center of the second image template.

5. The method of claim 1, further comprising warping the second image template using an affine transformation before identifying the second pixel.

6. The method of claim 5, further comprising projecting the identified second pixel to an image space of the second pixel to determine the second pixel location.

7. A non-transitory machine-readable medium including instructions that, when executed by a machine, cause a machine to perform operations for determining a multi-image three-dimensional (3D) ground control point (GCP), the operations comprising:
    extracting, from a first two-dimensional (2D) image including image data of a first geographical region, a first image template, the first image template including a contiguous subset of pixels from the first 2D image and a first pixel of the contiguous subset of pixels of the first 2D image indicated by the GCP, wherein the GCP is a five-tuple that associates a point in a three-dimensional (3D) point set with the first pixel of the first image;

predicting a first pixel location of the first pixel of the GCP in a second 2D image, the second 2D image including image data of a second geographical region overlapping with the first geographical region;

extracting, from the second 2D image, a second image template, the second image template including a contiguous subset of pixels from the second 2D image and a second pixel of the contiguous subset of pixels of the second 2D image corresponding to the first pixel location;

determining respective correlation scores, using a normalized cross-correlation, for the first image template centered at a variety of pixels of the contiguous subset of pixels of the second image template;

comparing a highest correlation score of the correlation scores to a first threshold value;

discarding a location of the second pixel responsive to determining a ratio is less than the first threshold value;

identifying an undiscarded highest correlation pixel of the second 2D image corresponding to a remaining highest correlation score; and adding a pixel location of the undiscarded highest correlation pixel to the GCP making the GCP a seven-tuple to register the second 2D image to the 3D point set.

8. The non-transitory machine-readable medium of claim 7, wherein the operations further comprise comparing a ratio, of the highest correlation score to a second highest correlation score, to a second threshold value and discarding the second pixel location if the ratio is less than the second threshold value.

9. The non-transitory machine-readable medium of claim 7, wherein the first pixel is the center of the first image template.

10. The non-transitory machine-readable medium of claim 7, wherein the second pixel is the center of the second image template.

11. The non-transitory machine-readable medium of claim 7, wherein the operations further comprise warping the second image template using an affine transformation before identifying the second pixel.

12. The non-transitory machine-readable medium of claim 11, wherein the operations further comprise projecting the identified second pixel to an image space of the second pixel to determine the second pixel location.

13. A system comprising:
a memory including image data of first and second images of a geographical region stored thereon; and
processing circuitry coupled to the memory, the processing circuitry configured to perform steps comprising:
extracting, from a first two-dimensional (2D) image including image data of a first geographical region, a first image template, the first image template including a contiguous subset of pixels from the first 2D image and a first pixel of the contiguous subset of pixels of the first 2D image indicated by the GCP, wherein the GCP is a five-tuple that associates a point in the 3D point set with the first pixel of the first image;

predicting a first pixel location of the first pixel of the GCP in a second 2D image, the second 2D image including image data of a second geographical region overlapping with the first geographical region;

extracting, from the second 2D image, a second image template, the second image template including a contiguous subset of pixels from the second 2D image and a second pixel of the contiguous subset of pixels of the second 2D image corresponding to the first pixel location;

determining respective correlation scores, using a normalized cross-correlation, for the first image template centered at a variety of pixels of the contiguous subset of pixels of the second image template;

comparing a highest correlation score of the correlation scores to a first threshold value;

discarding a location of the second pixel responsive to determining the ratio is less than the first threshold value;

identifying an undiscarded highest correlation pixel of the second 2D image corresponding to a remaining highest correlation score; and adding a pixel location of the undiscarded highest correlation pixel to the GCP making the GCP a seven-tuple to register the second 2D image to the 3D point set.

14. The system of claim 13, wherein the processing circuitry is further configured to compare a ratio, of the highest correlation score to a second highest correlation score, to a second threshold value and discarding the second pixel location if the ratio is less than the second threshold value.

* * * * *